(12) United States Patent
Norcott

(10) Patent No.: US 8,815,391 B1
(45) Date of Patent: Aug. 26, 2014

(54) STACKED POLYMER TECHNOLOGY. AN ALTERNATING POLYMER EXTRUSION PROCESS AND PRODUCT

(76) Inventor: Bryan A. Norcott, Amherst, NH (US)

( * ) Notice: Subject to any disclaimer, the term of this patent is extended or adjusted under 35 U.S.C. 154(b) by 582 days.

(21) Appl. No.: 13/199,182

(22) Filed: Aug. 22, 2011

Related U.S. Application Data

(60) Provisional application No. 61/403,906, filed on Sep. 23, 2010.

(51) Int. Cl.
- *D01D 5/34* (2006.01)
- *B29C 47/00* (2006.01)
- *B29C 47/06* (2006.01)
- B29L 31/00 (2006.01)
- A44B 18/00 (2006.01)

(52) U.S. Cl.
CPC .............. *D01D 5/34* (2013.01); *B29C 47/0054* (2013.01); *B29L 2031/729* (2013.01); *A44B 18/0061* (2013.01); *A44B 18/0049* (2013.01); *B29C 47/061* (2013.01); *B29C 47/06* (2013.01)

USPC ... 428/373; 24/451; 264/171.13; 264/172.15; 264/177.17; 428/100

(58) Field of Classification Search
CPC ........... A44B 18/0049; A44B 18/0053; A44B 18/0061; B29C 47/062; B29C 2031/729; D01D 5/32; D01D 5/34
USPC .................................................... 24/446, 451
See application file for complete search history.

(56) References Cited

U.S. PATENT DOCUMENTS

| 7,172,008 B2 * | 2/2007 | Vanbenschoten et al. ..... 156/544 |
| 7,182,992 B2 * | 2/2007 | Ausen et al. .................. 428/100 |

* cited by examiner

*Primary Examiner* — Christina Johnson
*Assistant Examiner* — David Schmerfeld
(74) *Attorney, Agent, or Firm* — Lambert & Associates; Gary E. Lambert; David J. Connaughton, Jr.

(57) ABSTRACT

A bi-component process which produces an extrusion splitable in the cross machine direction.

4 Claims, 3 Drawing Sheets

STACKED POLYMER TECHNOLOGY. AN ALTERNATING POLYMER EXTRUSION PROCESS AND PRODUCT

CROSS-REFERENCE TO RELATED APPLICATIONS

Application No. 61/403,906, Filing Date: Sep. 23, 2010, Name of Applicant: Bryan A. Norcott Title of Invention: Stacked Polymer Technology. An alternating polymer extrusion process and product.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of Polymer Extrusion.

Conventional bi-component extrusion places the different types of polymers along side of each other in a continuous stream with mating seams running the length of the extruded product. This arrangement creates a variety of existing products with each one having specific characteristics running in the extruded direction of the product.

SUMMARY OF THE INVENTION

The present invention is a process which will produce a multi component extrusion in an arrangement placing one type of polymer directly behind the other in a continuous extrusion process alternating each different type of polymer in order to produce new product possibilities that utilize these characteristics.

DETAILED DESCRIPTION OF THE INVENTION

Figure 1:
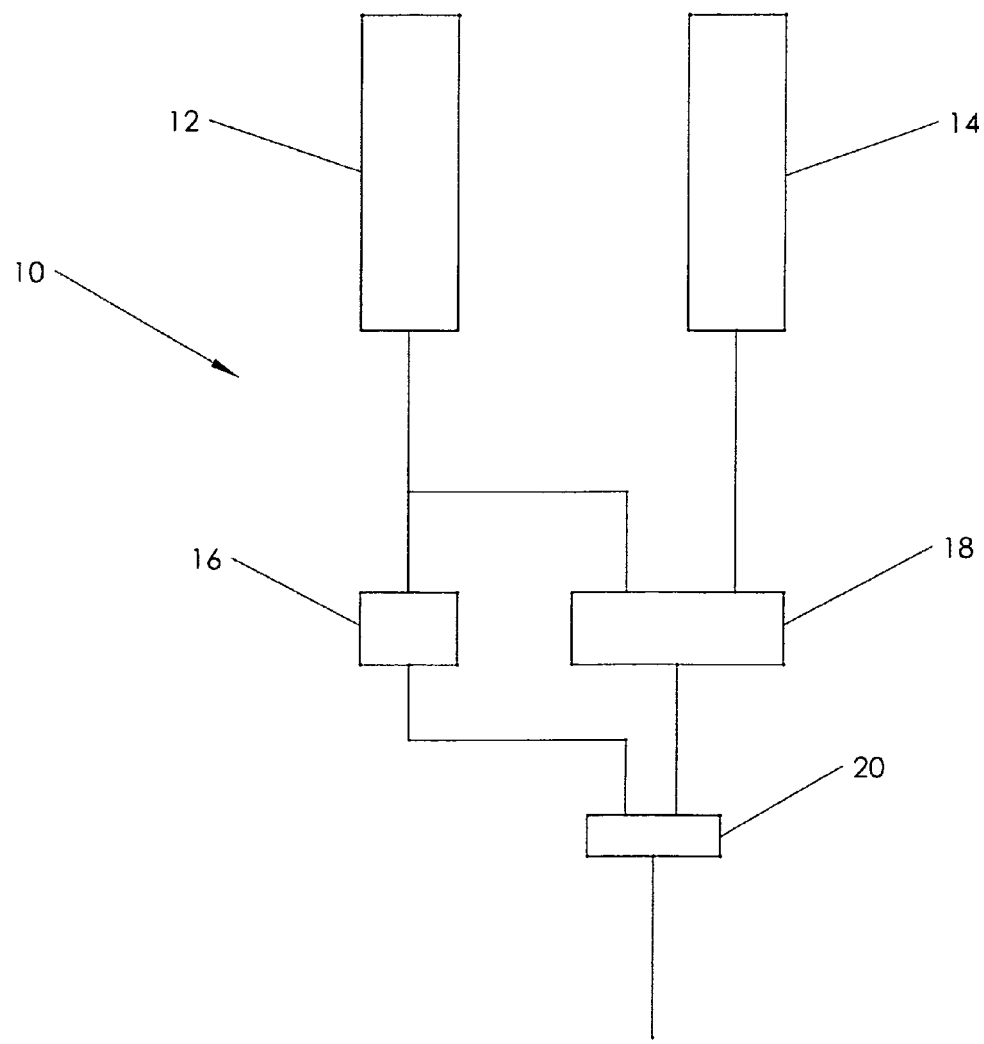
FIG. 1 is a schematic of the process of the present invention.

Referring now to the invention in more detail, in FIG. 1 a schematic 10 is of a polymer extrusion process which utilizes two extruders; in this example one extruder will be using polypropylene 12 and the other polyester 14.

In further detail, still referring to the invention of FIG. 1 extruder 12 and extruder 14 will be feeding gear pumps. Gear pump 16 which is fed from extruder 12 will provide a metered stream of polypropylene while gear pump 18 which is fed from both extruders 12 and 14 will provide a metered stream of alternating polypropylene and polyester, one directly behind the other and so on.

In further detail, gear pump 16 and gear pump 18 will feed a spin pack 20. Spin pack 20 will produce an extrusion commonly known in the industry as a sheath core. The core will be the metered stream received from gear pump 16 and the sheath will be the alternating polymer stream received from gear pump 18.

Figure 2:
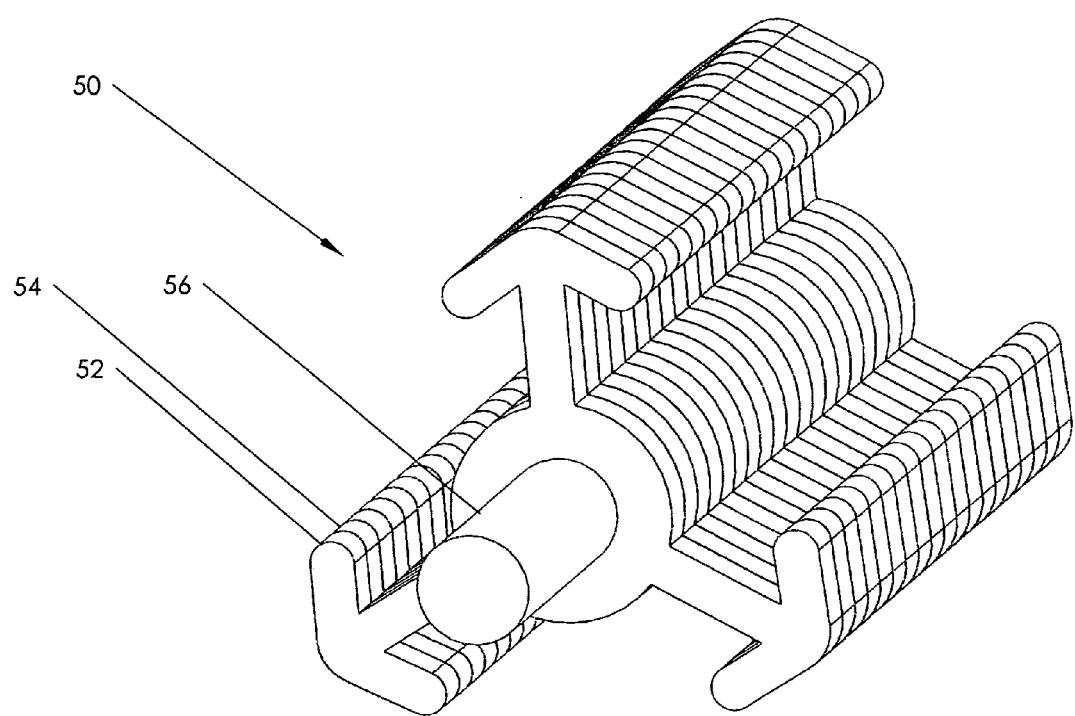
FIG. 2 is a perspective view of an example extruded product of the present invention.

Referring now to FIG. 2 there is shown an extruded product 50 having been extruded in a profile which resembles arrowheads in three places from spin pack 20. One arrowhead segment 52 comprises of polypropylene while the other arrowhead segment 54 comprises of polyester. Both 52 and 54 would be considered the sheath of a sheath core product. The core 56 comprises of polypropylene which links the continuous extruded product together.

Figure 3:
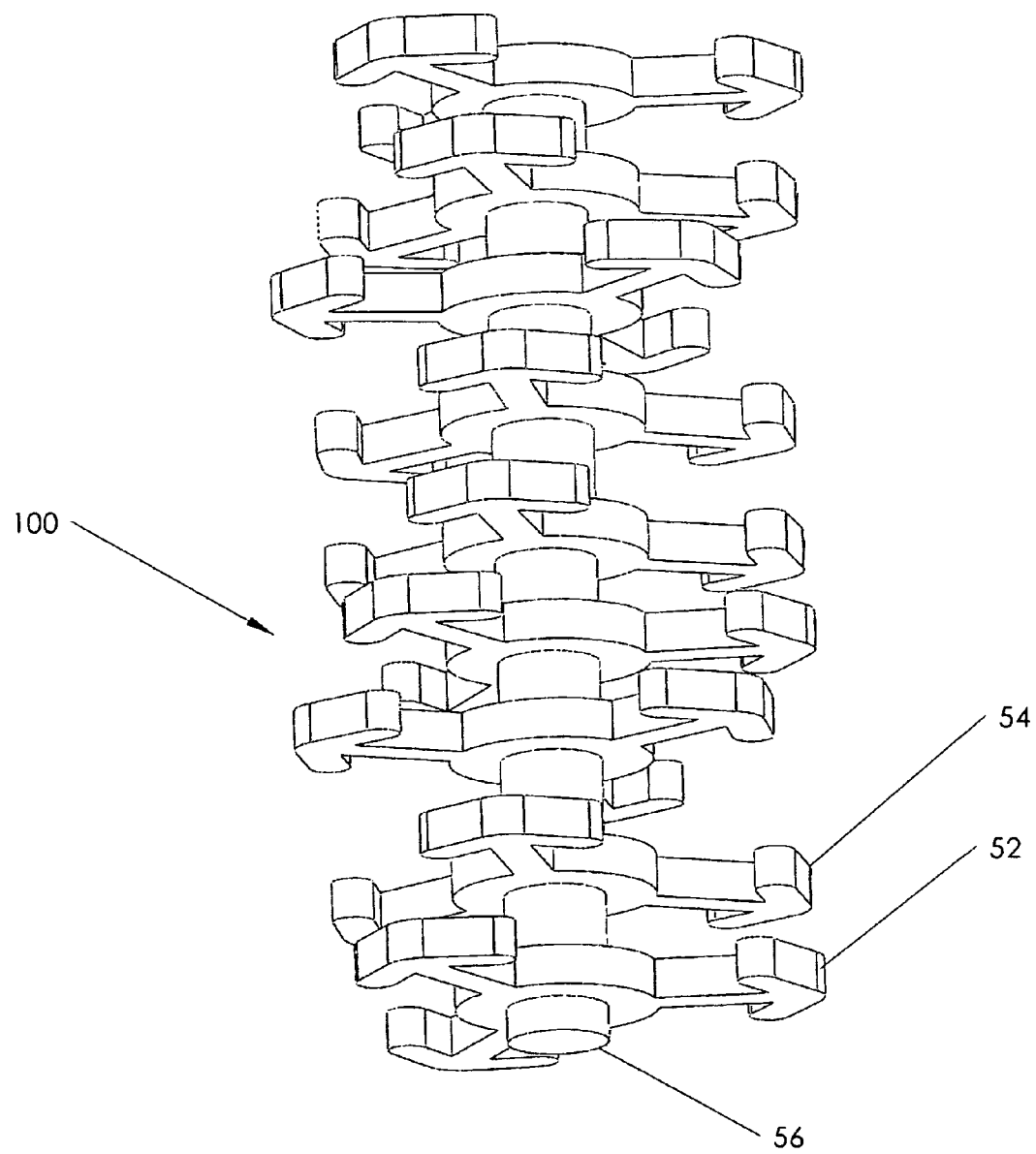
FIG. 3 is a perspective view of an example extruded product after separation of the present invention.

Referring now to FIG. 3 there is shown extruded product 50 in a stretched or drawn state 100. Item 52 and item 54 are now separated but still linked to the core 56. This is achievable because the properties of the two polymers do not allow adhesion. This process will work not only with polypropylene and polyester but any polymers that have similar properties.

The advantages of the present invention include, without limitation, the ability to produce an array of products that have characteristics that have never been available. The one example shown with this process was a fiber or extrusion that has hooks on it which will engage with a loop of another material. This example can be produced along with a nonwoven material in a continuous process creating a new product that fastens to its self.

In broad embodiment, the present invention is a bi-component extrusion process that allows separation in the cross machine direction which previously was not possible.

While the foregoing written description of the invention enables one of an experienced polymer extrusion background to make and use what is considered presently to be the best mode thereof, those of an experienced polymer extrusion background will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A method of making a fastener having hooks or barbs for engaging with loops of another material, comprising:
   extruding a continuous multi-component extrusion product having alternating segments of a first polymer segment alternating with a second polymer segment, wherein the first polymer segment comprises at least one hook or barb, the second polymer segment comprises at least one hook or barb, the first polymer material is dissimilar from the second polymer material, and the alternating segments are arranged directly behind one another in the extrusion direction;
   adding a continuous core of polymer to the multi-component extrusion product; and
   separating the alternating segments apart from one another, wherein the continuous core links the separated alternating segments together.

2. A method of making a fastener according to claim 1, wherein the geometry of an orifice of a spinneret or an extrusion die is changed to produce different shapes and/or sizes of the multi-component extrusion product.

3. A method of making a fastener according to claim 1, wherein in the separating step, the alternating segments are separated apart from one another with a slight draw, aspiration or mechanical agitation.

4. A method of making a fastener according to claim 1, wherein the continuous core is coextruded with the multi-component extrusion product.

\* \* \* \* \*